US010167173B1

(12) United States Patent
Abuelsaad et al.

(10) Patent No.: US 10,167,173 B1
(45) Date of Patent: Jan. 1, 2019

(54) PRIORITIZING THE DIRECTION OF A DIRECTIONAL PEDESTRIAN MOVER (DPM) IN REAL TIME, BASED ON PREDICTED PEDESTRIAN TRAFFIC FLOW

(71) Applicant: INTERNATIONAL BUSINESS MACHINES CORPORATION, Armonk, NY (US)

(72) Inventors: Kelly Abuelsaad, Somers, NY (US); Tamer E. Abuelsaad, Armonk, NY (US); Gregory J. Boss, Saginaw, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/825,320

(22) Filed: Nov. 29, 2017

Related U.S. Application Data

(63) Continuation of application No. 15/690,370, filed on Aug. 30, 2017.

(51) Int. Cl.
*B65G 15/00* (2006.01)
*B65G 23/00* (2006.01)
(Continued)

(52) U.S. Cl.
CPC .................................. *B66B 25/003* (2013.01)

(58) Field of Classification Search
None
See application file for complete search history.

(56) References Cited

U.S. PATENT DOCUMENTS

2009/0018797 A1* 1/2009 Kasama ............... G01C 22/006 702/160
2014/0070790 A1* 3/2014 Fujiwara ................ G01R 21/00 324/76.11
2016/0016756 A1* 1/2016 Elomaa ................. B66B 1/3446 700/275

FOREIGN PATENT DOCUMENTS

CN 103218816 A 7/2013
DE 102010021727 A1 12/2011
(Continued)

OTHER PUBLICATIONS

San Francisco Bay Area Rapid Transit District, "Escalator direction change Embarcadero Station," https://www.bart.gov/news/articles/2016/news20160808-1, Copyright 2017 San Francisco Bay Area Rapid Transit District, Archive Date: Aug. 8, 2016, Printed on Jun. 16, 2017, pp. 1-1.

(Continued)

*Primary Examiner* — Yolanda R Cumbess
(74) *Attorney, Agent, or Firm* — Jordan T. Schiller

(57) ABSTRACT

The program directs a computer processor to implement a program that prioritizes a direction of movement of a directional pedestrian mover (DPM) based on predicted pedestrian traffic flow. The program obtains a first predicted pedestrian traffic flow relative to the direction of movement of the DPM, and a second predicted pedestrian traffic flow in a different direction relative to the first predicted pedestrian traffic flow. The program determines that the second predicted pedestrian traffic flow exceeds the first predicted pedestrian traffic flow, and changes the direction of movement of the DPM to accommodate the second predicted pedestrian traffic flow. The program calculates a time for a majority of the first predicted pedestrian traffic flow, and a majority of the second predicted pedestrian traffic flow, to reach at least one access point of the DPM.

1 Claim, 8 Drawing Sheets

(51) Int. Cl.
*G05B 13/02* (2006.01)
*G05B 15/00* (2006.01)
*B66B 25/00* (2006.01)

(56) References Cited

FOREIGN PATENT DOCUMENTS

| | | | |
|---|---|---|---|
| EP | 2625079 | A2 | 8/2013 |
| KR | 20010056078 | A | 7/2001 |
| KR | 20100061012 | A | 6/2010 |
| WO | 2013092373 | A1 | 6/2013 |
| WO | 2017015842 | A1 | 2/2017 |

OTHER PUBLICATIONS

Davidich et al., "Predicting Pedestrian Flow: A Methodology and a Proof of Concept Based on Real-Life Data," PLoS | One 8(12), Published: Dec. 27, 2013, http://journals.plos.org/plosone/article?id=10.1371/journal.pone.0083355, pp. 1-14.

Mitsubishi Electric, "Elevator Group Control System, ΣAI-2200C, Artificial Intelligence System," http://www.mitsubishielevator.com/images/uploads/documents/pdf/elevators/high-speed/AI-2200C-_Updated.pdf, Printed on Jun. 16, 2017, pp. 1-10.

Repetski, "Why can't Metro change how it runs escalators, what info its signs display, or how easy it is to walk on station stairs?" Oct. 7, 2016, https://ggwash.org/view/43096/why-cant-metro-change-how-it-runs-escalators-what-info-its-signs-display-or-how-easy-it-is-to-walk-on-station-stairs, pp. 1-17.

Loukaitou-Sideris et al., "Passenger Flows in Underground Railway Stations and Platforms," MINETA Transportation Institute, MTI Report 12-43, May 2015, Copyright © 2015 by Mineta Transportation Institute, pp. 1-123.

Loukaitou-Sideris et al., State of California—Department of Transportation, Technical Report Documentation p. CA16-2829, Passenger Flows in Underground Railway Stations and Platforms, MTI Report 12-43, May 2015, Copyright © 2015 by Mineta Transportation Institute, pp. 1-125.

Yuen et al.,"An intellilgence-based route choice model for pedestrial flow in a transportation station," Applied Soft Computing, Available online Jul. 15, 2014, Published Nov. 2014, pp. 31-39.

Mell et al., "The NIST Definition of Cloud Computing," National Institute of Standards and Technology, U.S. Department of Commerce, Special Publication 800-145, Sep. 2011, pp. 1-7.

Hausknecht et al., "Dynamic Lane Reversal in Traffic Management," Proceedings of the 14th ITS Conference (ITSC 2011), Washington, DC, USA, Oct. 2011, pp. 1-6.

Abuelsaad et al., Pending U.S. Appl No. 15/690,370, filed Aug. 30, 2017, titled "Prioritizing the Direction of a Directional Pedestrian Mover (DPM) in Real Time, Based on Predicted Pedestrian Traffic Flow," pp. 1-37.

IBM: List of IBM Patents or Patent Applications Treated As Related (Appendix P), Nov. 29, 2017, pp. 1-2.

* cited by examiner

PRIORITIZING THE DIRECTION OF A DIRECTIONAL PEDESTRIAN MOVER (DPM) IN REAL TIME, BASED ON PREDICTED PEDESTRIAN TRAFFIC FLOW

BACKGROUND

The present disclosure relates generally to the field of computing and more particularly to data processing and management of directional pedestrian movers (DPMs).

BRIEF SUMMARY

Embodiments of the present invention disclose a method, a computer program product, and a system.

According to an embodiment, a computer-implemented method for prioritizing a direction of a DPM based on predicted pedestrian traffic flow. The method obtains a first predicted pedestrian traffic flow relative to the direction of movement of the DPM, and a second predicted pedestrian traffic flow in a different direction relative to the first predicted pedestrian traffic flow. The method determines that the second predicted pedestrian traffic flow exceeds the first predicted pedestrian traffic flow, and changes the direction of movement of the DPM to accommodate the second predicted pedestrian traffic flow.

According to another embodiment, a computer program product for prioritizing a direction of a DPM based on predicted pedestrian traffic flow. The storage device embodies program code that is executable by a processor of a computer to perform a method. The method obtains a first predicted pedestrian traffic flow relative to the direction of movement of the DPM, and a second predicted pedestrian traffic flow in a different direction relative to the first predicted pedestrian traffic flow. The method determines that the second predicted pedestrian traffic flow exceeds the first predicted pedestrian traffic flow, and changes the direction of movement of the DPM to accommodate the second predicted pedestrian traffic flow.

According to another embodiment, a system for prioritizing a direction of a DPM based on predicted pedestrian traffic flow. The one or more storage devices embody a program. The program has a set of program instructions for execution by the one or more processors. The program instructions include instructions for obtaining a first predicted pedestrian traffic flow relative to the direction of movement of the DPM, and a second predicted pedestrian traffic flow in a different direction relative to the first predicted pedestrian traffic flow. The program instructions include instructions for determining that the second predicted pedestrian traffic flow exceeds the first predicted pedestrian traffic flow. The program instructions include instructions for changing the direction of movement of the DPM to accommodate the second predicted pedestrian traffic flow.

DETAILED DESCRIPTION

The present invention discloses a method for prioritizing a movement of a directional pedestrian mover (e.g. escalator, elevator, moving walkway) based on real time and predictive pedestrian traffic. A cognitive feature involved in the process may detect arrivals, departures, delays, cancellations and so forth, in a busy airport or bus station, for example. Additionally, the cognitive feature may detect a volume of pedestrians approaching the DPM, wherein the DPM is moving in the opposite direction in which the volume of pedestrians need to go.

Existing DPMs lack the cognitive feature to predict a volume of directional flows of pedestrian traffic in heavily trafficked venues, and to automatically change the DPM in order to most efficiently facilitate the flow of pedestrian traffic and prevent bottlenecks in and around the DPM. The present invention keys off of live events to anticipate the flow of pedestrian traffic before it occurs, and determines the optimal time to change the direction of the DPM based on that information.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
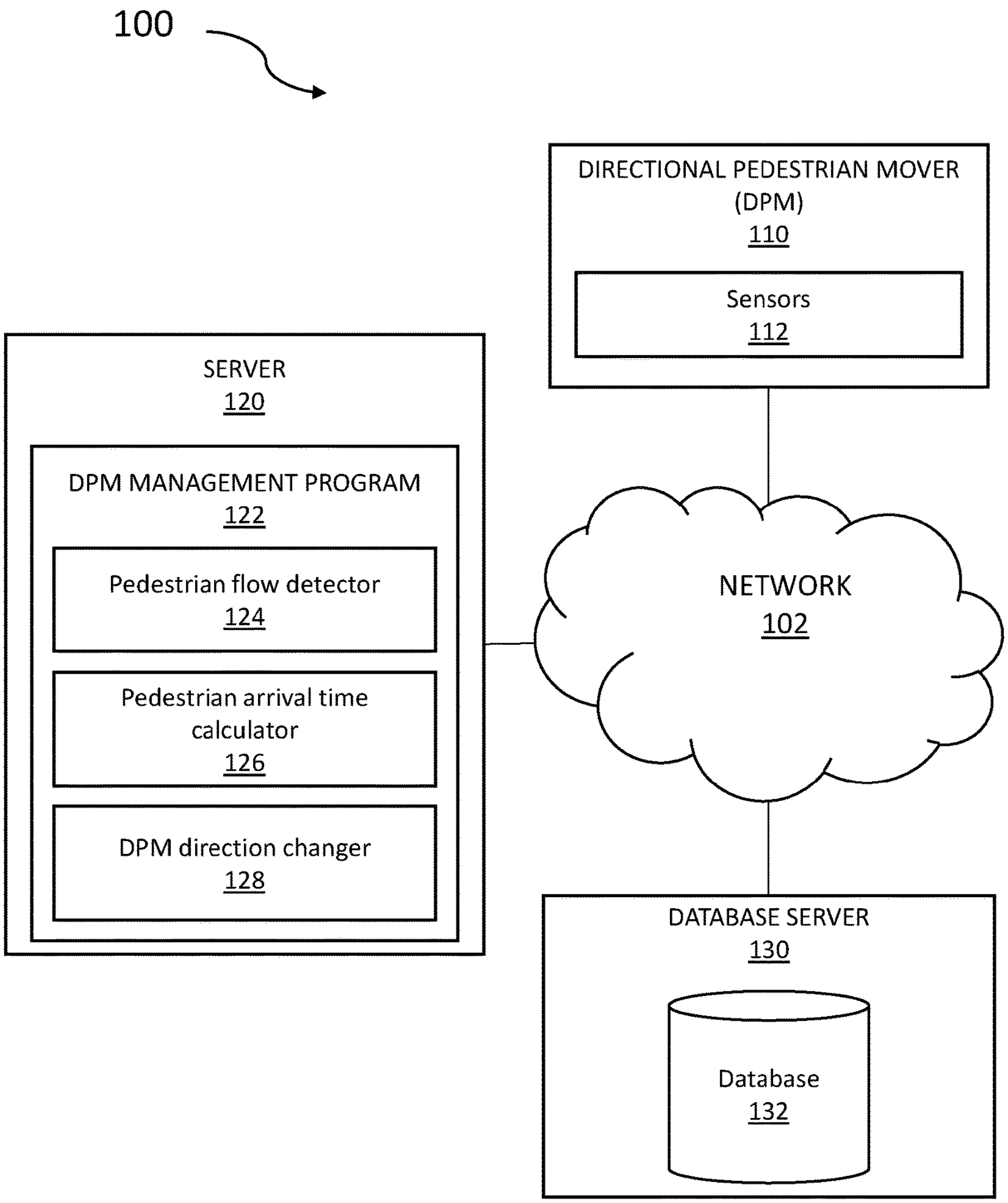
FIG. 1 illustrates a computing environment, in accordance with an embodiment of the present invention.

FIG. 1 is a functional block diagram of a computing environment 100, according to an embodiment of the present invention. Computing environment 100 includes directional pedestrian mover 110, server 120, and database server 130 all connected via network 102. The setup in FIG. 1 represents an example embodiment configuration for the present invention, and is not limited to the depicted setup in order to derive benefit from the present invention.

In the example embodiment, directional pedestrian mover 110 contains sensors 112. In various embodiments, directional pedestrian mover 110 may be an escalator, elevator, moving walkway, moving sidewalk, gondola, carriage, chairlift, or any other mode of transportation used to convey, carry, lift, move, or transfer people from one place to another. Directional pedestrian mover 110 may contain any programmable electronic device capable of communicating with server 120 and database server 130 via network 102. Directional pedestrian mover 110 may also have wireless connectivity capabilities allowing it to communicate with server 120, database server 130, and other computers or servers over network 102.

In the example embodiment, sensors 112 is an electronic component, module, or subsystem capable of detecting events or changes in its environment and sending the information to other electronics (e.g. a computer processor). Sensors 112, in exemplary embodiments, may be located within, or near, directional pedestrian mover 110. Sensors 112 may be a global positioning system (GPS), WiFi, software applications, proximity sensor, camera, microphone, light sensor, infrared sensor, passive infrared (PIR) sensor, weight sensor, tactile sensor, motion detector, optical character recognition (OCR), occupancy sensor, heat sensor, analog sensor (e.g. potentiometers, force-sensing resistors), radar, radio frequency sensor, video camera, digital camera, Internet of Things (IoT) sensors, lasers, or other device used for measuring an environment or current state. In the example embodiment, sensors 112 is referenced via network 102.

In the example embodiment, database server 130 includes database 132 and may be a laptop computer, tablet computer, netbook computer, personal computer (PC), a desktop computer, a personal digital assistant (PDA), a smart phone, a server, or any programmable electronic device capable of communicating with directional pedestrian mover 110 and server 120 via network 102. While database server 130 is shown as a single device, in other embodiments, database server 130 may be comprised of a cluster or plurality of computing devices, working together or working separately.

In the example embodiment, database 132 may contain daily, weekly, monthly, and/or yearly information detailing flight, train, or bus schedules, and on the fly changes to those schedules, such as delays, cancellations, changes of gate, track, or platform arrivals and departure information at airports, train stations, or bus stations. Database 132 may also contain traffic information leading up to concert halls, stadiums, shopping malls, or other mass population venues. Additionally, database 132 may contain daily, weekly, monthly, and/or yearly schedules of events for mass popular venues such as concert halls, stadiums, shopping malls, as well as on the fly changes to those schedules of events, such as delays, cancellations, changes of public access gates, closures of certain stairwells, elevators, or escalators and so forth.

In the exemplary embodiment, database 132 may be updated and temporarily stored in real-time via an internet connection or direct access to a venue's scheduling system, or via the cloud. Database 132 communicates with server 120 via network 102.

In the example embodiment, server 120 contains DPM management program 122. In various embodiments, server 120 may be a laptop computer, tablet computer, netbook computer, personal computer (PC), a desktop computer, a personal digital assistant (PDA), a smart phone, or any programmable electronic device capable of communicating with directional pedestrian mover 110 and database server 130 via network 102. Server 120 may include internal and external hardware components, as depicted and described in further detail below with reference to FIG. 7. In other embodiments, server 120 may be implemented in a cloud computing environment, as described in relation to FIG. 8 and FIG. 9, herein. Server 120 may also have wireless connectivity capabilities allowing it to communicate with directional pedestrian mover 110, database server 130, and other computers or servers over network 102.

With continued reference to FIG. 1, DPM management program 122, in the example embodiment, may be a computer application on server 120 that contains instruction sets, executable by a processor. The instruction sets may be described using a set of functional modules. DPM management program 122 receives input from sensors 112 and database 132. In alternative embodiments, DPM management program 122 may be a standalone program on a separate electronic device. DPM management program 122 performs various functions, as fully described below.

DPM management program 122 may be configured to obtain a first predicted pedestrian traffic flow relative to the direction of movement of the DPM, and a second predicted pedestrian traffic flow in a different direction relative to the first predicted pedestrian traffic flow. DPM management program 122 determines that the second predicted pedestrian traffic flow exceeds the first predicted pedestrian traffic flow. DPM management program 122 changes the direction of movement of the DPM to accommodate the second predicted pedestrian traffic flow, in order to prevent pedestrian bottlenecking around the DPM.

With continued reference to FIG. 1, the functional modules of DPM management program 122 include pedestrian flow detector 124, pedestrian arrival time calculator 126, and DPM direction changer 128.

Pedestrian flow detector 124 includes a set of programming instructions, in DPM management program 122, to obtain a first predicted pedestrian traffic flow relative to the direction of movement of the DPM and a second predicted pedestrian traffic flow in a different direction relative to the first predicted pedestrian traffic flow. The set of programming instructions is executable by a processor.

Pedestrian traffic flow, in the exemplary embodiment, includes a rate that pedestrians are moving (i.e. walking, mobilizing) towards a given access point of a DPM. For example, during morning rush hour, the rate of pedestrians entering an office building is greater than the rate of pedestrians exiting the office building. Therefore, the direction of movement of DPMs in the office building during morning rush hour accommodates the entry of pedestrians into the office building. Likewise, during afternoon rush hour, the rate of pedestrians exiting an office building is greater than the rate of pedestrians entering the office building. Therefore, the direction of movement of DPMs in the office building during afternoon rush hour accommodates the exit of pedestrians from the office building. In alternative embodiments, various metrics may be used to measure pedestrian traffic (e.g. volume, speed, density).

A first predicted pedestrian traffic flow relative to the direction of movement of the DPM, in the exemplary embodiment, means the flow of pedestrians towards a DPM that is moving with the traffic flow of the pedestrians (e.g. pedestrians need to go down a floor level, and the movement of the DPM is going down). A second predicted pedestrian traffic flow in a different direction relative to the first predicted pedestrian traffic flow, means the flow of pedestrians toward a DPM that is moving against the traffic flow of the pedestrians (e.g. pedestrians need to go up a floor level, and the movement of the DPM is going down). In accordance with an embodiment of the invention, predicted pedestrian traffic flow is obtained via sensors 112 that may be located at various ingress/egress points around a venue, and communicate with DPM management program 122. Ingress/egress points around a venue are used, in exemplary embodiments, to pinpoint locations in relation to a first predicted pedestrian traffic flow and a second predicted pedestrian traffic flow, respectively.

A different direction relative to the first predicted pedestrian traffic flow, in the exemplary embodiment, may include an alternate, or opposite, direction of the direction of the first predicted pedestrian traffic flow. In exemplary embodiments, the first predicted pedestrian traffic flow moves in a direction relative to the direction of movement of a given DPM. For example, if the direction of movement of the DPM (e.g. escalator) is moving from north to south, then a different direction relative to the direction of north to south may be the direction of movement of the DPM moving from south to north. In alternative embodiments, a different direction relative to the direction of movement of the DPM may include multiple different directions of the direction of movement of a given DPM. For example, but not limited to the embodiments herein, a DPM (e.g. moving walkway) may be Y shaped, where three different directions of movement of the DPM are converging together, moving apart, or flowing in multi-directional pathways.

Figure 2:
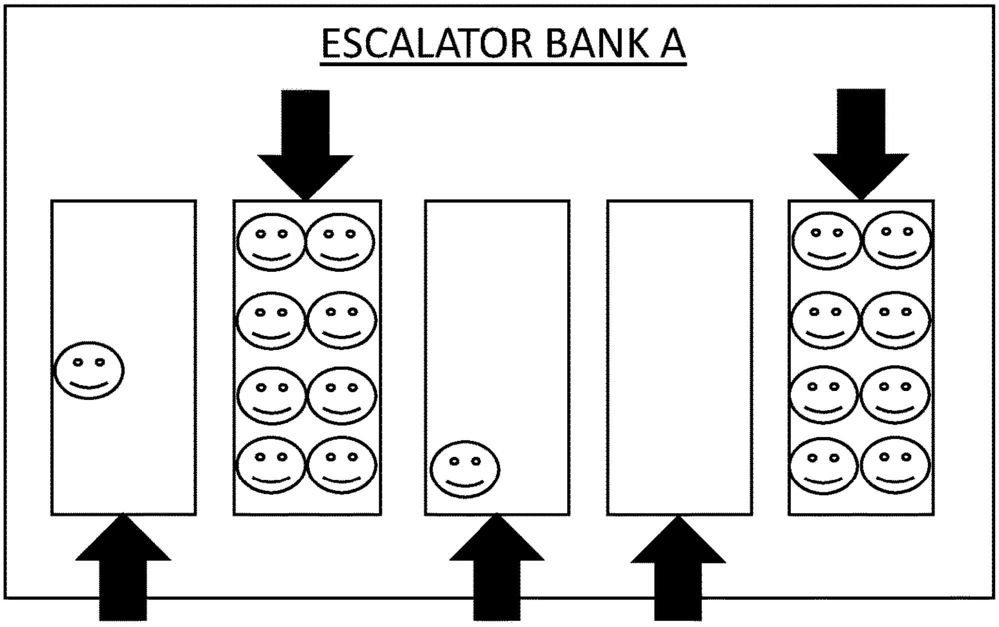
FIG. 2 illustrates an inefficient use of a DPM, in accordance with the current state of the art.

In an exemplary embodiment, and with reference to FIG. 1 and FIG. 2, pedestrian flow detector 124 may receive information from sensors 112 detailing pedestrian traffic flow at various locations (e.g. ingress/egress points) at an airport. Sensors 112 at an airport may detect pedestrian traffic located at Gate B16, due to a plane arrival. Sensors 112 may further detect pedestrian traffic located at Gate B14, due to a simultaneous plane arrival. The pedestrian traffic flow moves from Gate B16 and Gate B14 toward escalator bank A, in order to get to baggage claim. Escalator bank A contains five escalators in a row, however three of the escalators are moving in an up direction, while only two are moving in a down direction. The pedestrian traffic flow going down the escalators, at escalator bank A, is greater than the pedestrian traffic flow going up the escalators, at escalator bank A, at the time that the pedestrians from Gate B16 and Gate B14 converge on escalator bank A. As such, the pedestrians at escalator bank A will begin to bottleneck around the two escalators moving in the down direction, while the three escalators moving in the up direction are nearly empty. This is an example of an inefficient use of escalator bank A.

Figure 3:
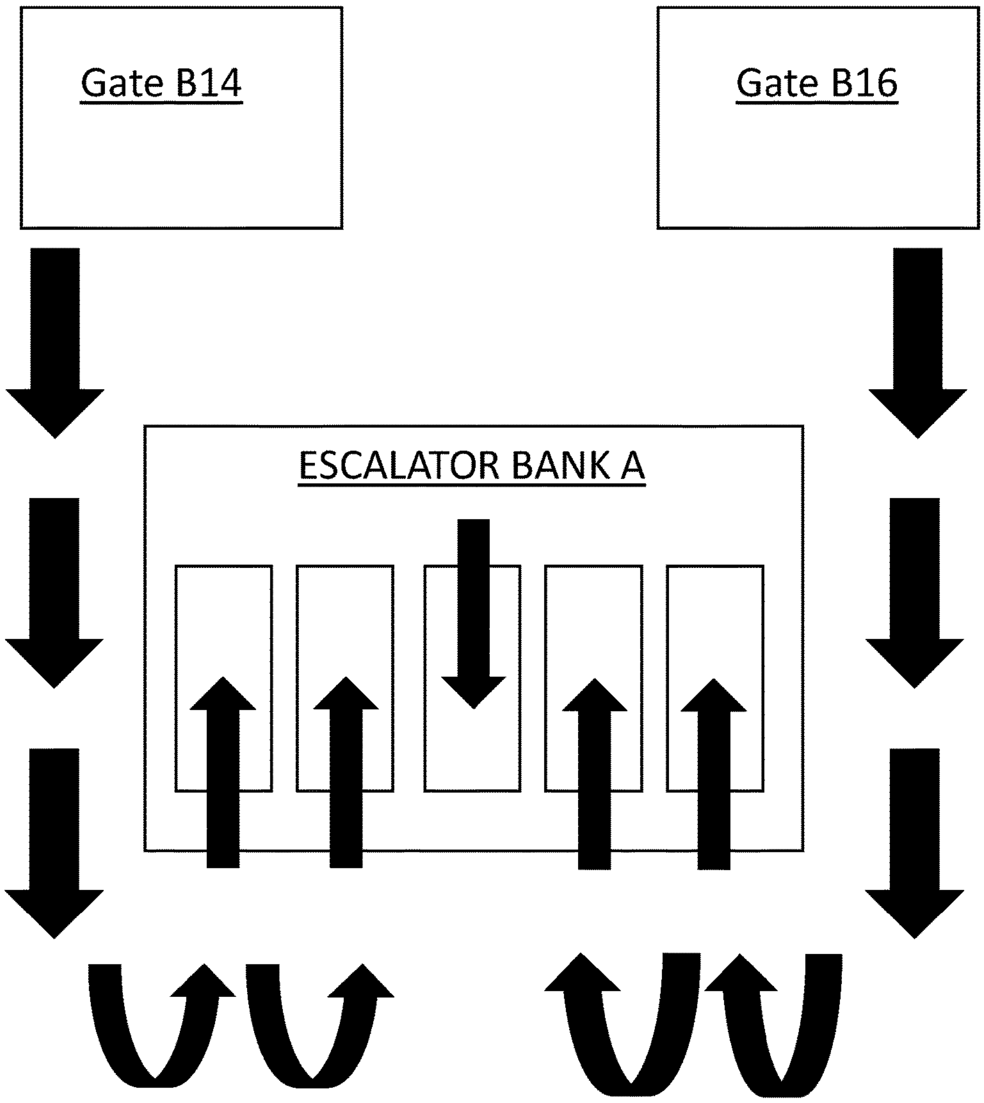
FIG. 3 illustrates an efficient use of a DPM, in accordance with an embodiment of the present invention.

In an exemplary embodiment, and with reference to FIG. 1 and FIG. 3, pedestrian flow detector 124 may receive a second predicted pedestrian traffic flow for pedestrians that are moving towards escalator bank A in a different direction relative to the first predicted pedestrian traffic flow (e.g. pedestrians that need to go up the escalators). In this example, based on the simultaneous plane arrivals from Gate B16 and Gate B14, either received from database 134, as well as the second predicted pedestrian traffic flow information from sensors 112, the first predicted pedestrian traffic flow necessitating the need to go up the escalators, at this particular time, exceeds the second pedestrian traffic flow necessitating the need to go down the escalators, at this particular time.

With continued reference to FIG. 1 and FIG. 3, in an alternative embodiment, a first predicted pedestrian traffic flow may need to go up a given escalator, while a second predicted pedestrian traffic flow may need to go down the same escalator at different times. However, the locations for the first predicted pedestrian traffic flow and the second predicted pedestrian traffic flow, respectively, are located at different distances from escalator bank A. As such, pedestrian flow detector 124 collects the following information, via sensors 112 and database 132 for both the first predicted pedestrian traffic flow and the second predicted pedestrian traffic flow: the distance between the location (i.e. Gate B16 and Gate B14) and the access point for the given DPM; people density of the pedestrian traffic flow (i.e. number of people in the group moving towards the given DPM); the average speed of the pedestrian traffic flow moving towards the given DPM; schedules of events that will be causing pedestrian traffic flow towards the given DPM; and whether the pedestrian traffic flow is moving in the direction of movement of the given DPM.

Pedestrian arrival time calculator 126 includes a set of programming instructions in DPM management program 122, to calculate a time for a majority of the first predicted pedestrian traffic flow, and a majority of the second predicted pedestrian traffic flow, to reach at least one access point of a DPM, wherein changing the direction of movement of the DPM is based on determining that the time for the majority of the second predicted pedestrian traffic flow to reach the at least one access point of the DPM is less than the time for the majority of the first pedestrian traffic flow to reach the at least one access point of the DPM. The set of programming instructions is executable by a processor.

In the exemplary embodiment, pedestrian arrival time calculator 126 receives input from pedestrian flow detector 124, wherein a majority of the first, or second, pedestrian traffic flow may include a threshold value of a group of detected pedestrians, via sensors 112, wherein the threshold value may be one more than 50% of the detected pedestrians (i.e. threshold value for 10 pedestrians may be 6 pedestrians). In alternative embodiments, threshold values may be manually configured wherein negligible values (i.e. less than 50% of the detected pedestrians in a group) may be ignored by pedestrian arrival time calculator 126.

In the exemplary embodiment, pedestrian arrival time calculator 126 calculates a time for a majority of the first predicted pedestrian traffic flow and a majority of the second predicted pedestrian traffic flow, to reach at least one access point of a given DPM by determining a first time factor and a second time factor. A first time factor is determined by dividing estimated distance information, for the majority of the first predicted pedestrian traffic flow, by an average pedestrian travel speed, for the majority of the first predicted traffic flow. A second time factor is determined by dividing estimated distance information, for the majority of the second predicted pedestrian traffic flow, by an average pedestrian travel speed, for the majority of the second predicted pedestrian traffic flow.

The estimated distance information, and average pedestrian travel speed, may be obtained from sensors 112. In alternative embodiments, the estimated distance information, and average pedestrian travel speed, may be obtained via any other technology known to one of ordinary skill in the art, located throughout a given venue that is capable of communicating with DPM management program 122.

With continued reference to FIG. 3 and an illustrative example, Gate B16 and Gate B14 airplane arrivals may de-board at the same time. Both Gate B16 and Gate B14 move toward escalator bank A to retrieve their baggage, one flight up, at baggage claim. However, Gate B16 is located closer to escalator bank A than Gate B14. At the same time as the airline passengers de-board at Gate B16 and Gate B14, a busload of pedestrians arrive at the bus drop-off, which is located upstairs near baggage claim. The bus passengers move toward escalator bank A, one flight down, to check-in for their departing flight.

With continued reference to the above illustrative example, pedestrian arrival time calculator 126 divides the estimated distance, for the majority of the airplane passengers from Gate B16, to escalator bank A (1000 feet) by the average pedestrian travel speed, for the majority of the airplane passengers from Gate B16, toward escalator bank A (4 feet per second), to determine an average pedestrian travel time, for the majority of the airplane passengers from Gate B16, to the access point of escalator bank A (250 seconds or 4.2 minutes) Likewise, pedestrian arrival time calculator 126 divides the estimated distance, for the majority of the airplane passengers from Gate B14, to escalator bank A (5000 feet) by the average pedestrian travel speed, for the majority of the airplane passengers from Gate B14, toward escalator bank A (5 feet per second), to determine an average pedestrian travel time, for the majority of the airplane passengers from Gate B14, to the access point of escalator bank A (1000 seconds or 16.67 minutes). Similarly, pedestrian arrival time calculator 126 divides the estimated distance from the bus drop-off to escalator bank A (3000 feet) by the average pedestrian travel speed, for the majority of the bus passengers, toward escalator bank A (2 feet per second), to determine an estimated pedestrian arrival time, for the majority of the bus passengers, to the access point of escalator bank A (1500 seconds or 25 minutes).

In the exemplary embodiment, pedestrian arrival time calculator 126, when calculating a time for a majority of the first predicted pedestrian traffic flow, and a majority of the second predicted pedestrian traffic flow, to reach the at least one access point of the DPM, may also add an additional time factor to the second time factor to accommodate the time it takes to change the direction of movement of the given DPM, and add an additional time factor to the second time factor to accommodate the time it takes for all pedestrians on the DPM to exit the DPM before changing the direction of movement of the DPM. For example, an average DPM may require two minutes to safely convert the DPM direction of movement (e.g. from downward movement to upward movement, or vice versa). The two minutes may include the gradual slowdown of the DPM to a stop, and then the gradual ramp up to normal speed. In the exemplary embodiment, the conversion time is constant, however, it may need to be increased as the DPM equipment ages over time. The second time factor refers only to the second predicted pedestrian traffic flow, which is the pedestrian traffic flow moving towards a DPM, in a different direction relative to the first predicted pedestrian traffic flow, thereby necessitating a change in direction of movement of the DPM.

With continued reference to FIG. 3 and the illustrative example above, the escalators in escalator bank A may be moving in an upward direction, as such accommodating the Gate B16 pedestrians, without the need to change the direction of movement of the escalators. In order to change the direction of movement of the escalators to a downward direction, to accommodate the bus passengers, an extra two minutes may be added on to the arrival time in order to accommodate the slow-down, stop, and reversal of directional change of movement of the escalators. Similarly, to change the direction of movement of the escalators back to an upward direction for the Gate B14 pedestrians, an extra two minutes may be added on to the arrival time.

In the exemplary embodiment, pedestrian arrival time calculator 126 may also add an additional time factor to the second time factor to accommodate the time it takes for all pedestrians on the DPM to exit the DPM before changing the direction of movement of the DPM. This safeguard prevents the DPM from changing directions while one or more pedestrians are currently on it.

In the exemplary embodiment, a DPM may contain one or more sensors 112 to detect a pedestrian entering and exiting the DPM. In alternative embodiments, additional one or more sensors (e.g. weight sensors) may be employed to determine if one or more pedestrians remain on the DPM, before changing the direction of movement of the DPM. In other embodiments, a pedestrian may be detected entering and exiting the DPM via multiple sensors, or other device capable of detecting the pedestrian, at various points along the DPM. In other embodiments, a countdown time, configured manually, may be added to the arrival time algorithm to prevent the DPM from changing its direction of movement prematurely.

With continued reference to FIG. 3 and the illustrative example above, if there are any pedestrians remaining on the escalator, from the Gate B16 pedestrians, that have not yet exited the escalator moving up towards baggage claim, pedestrian arrival time calculator 126 may include the additional time that it will take for the remaining pedestrians to exit the escalator prior to changing the direction of movement of the escalator to accommodate the bus passengers.

In exemplary embodiments, pedestrian arrival time calculator 126 is capable of obtaining one or more schedule of events, at a given venue, that may affect the majority of the first predicted pedestrian traffic flow, and the majority of the second predicted pedestrian traffic flow, from the respective locations and to the at least one access point of the DPM.

In exemplary embodiments, pedestrian arrival time calculator 126 is capable of queueing a list of times for changing the direction of movement of the DPM based on one or more schedule of events at a given venue. As such, DPM management program 122 may have a stored set list of times throughout the day, based on expected pedestrian traffic flow, to change the direction of movement of a given DPM. Additionally, DPM management program 122, via pedestrian arrival time calculator 126, may deviate from the stored set list of times, based on detected first predicted pedestrian traffic flow and second predicted pedestrian traffic flow in real-time.

In an exemplary embodiment, pedestrian arrival time calculator 126 may be capable of detecting a location for one or more pedestrians at an airport via Internet of Things (IoT) sensors, obtaining a destination gate and departure time, for the one or more pedestrians at the airport, calculating a time for the one or more pedestrians to reach the destination gate, and changing the direction of one or more DPMs, located between the one or more pedestrians and a respective destination gate along a travel path in the airport, to accommodate the one or more pedestrians that are at risk of not reaching the destination gate on time. In alternative embodiments, pedestrian arrival time calculator 126 may detect an individual's location at an airport via a user application on the user's computing device (e.g. an airline application on a user's smartphone).

In the exemplary embodiment, pedestrian arrival time calculator 126 may search the airline passenger's destination gate and departure time (e.g. in the case of a layover flight) and calculate the airline passenger's project arrival time at the destination gate, based on the airline passenger's current location. Pedestrian arrival time calculator 126 may consider "on time" as arriving to the destination gate by the flight's boarding time, which is typically thirty minutes prior to the departure time. Pedestrian arrival time calculator 126 may then calculate this information for all of the passengers (e.g. a group of passengers) on the layover flight, with the same destination, and factor this information into changing the direction of movement of one or more DPMs, located between the group of passengers, and the respective destination gate, along a travel path in the airport. As such, passengers in jeopardy of missing a connection flight while making their way to their destination gate in the airport will receive a greater priority when approaching DPMs over those passengers, without tight layover flight connections, approaching DPMs in a different direction relative to the passengers in jeopardy.

DPM direction changer 128 includes a set of programming instructions in DPM management program 122, to change the direction of movement of the DPM to accommodate the second predicted pedestrian traffic flow. The set of programming instructions is executable by a processor.

In the exemplary embodiment, DPM direction changer 128 receives input from pedestrian arrival time calculator 126, sensors 112, and database 132. DPM direction changer 128 is capable of providing a warning, to pedestrians, that the direction of movement of the DPM is about to change, and closing at least one access point to the DPM. The warning may be flashing lights, an audio recording advising that the DPM is changing directions, a beeping sound, or other means that obtain the attention of pedestrians in a visual, auditory, or other sensory fashion. In the exemplary embodiment, closing at least one access point to the DPM may entail a gate opening up, at the access point of the DPM, to prevent pedestrians from further entering the DPM.

With continued reference to FIG. 3 and the illustrative example above, DPM direction changer 128 receives anticipated arrival times for first predicted pedestrian traffic flows and second predicted pedestrian traffic flows to escalator bank A, via pedestrian arrival time calculator 126. DPM direction changer 128 also receives anticipated arrival times for pedestrian traffic flow toward escalator bank A, based on schedule information from database 132.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between directional pedestrian mover 110, server 120, and database server 130.

Figure 4:
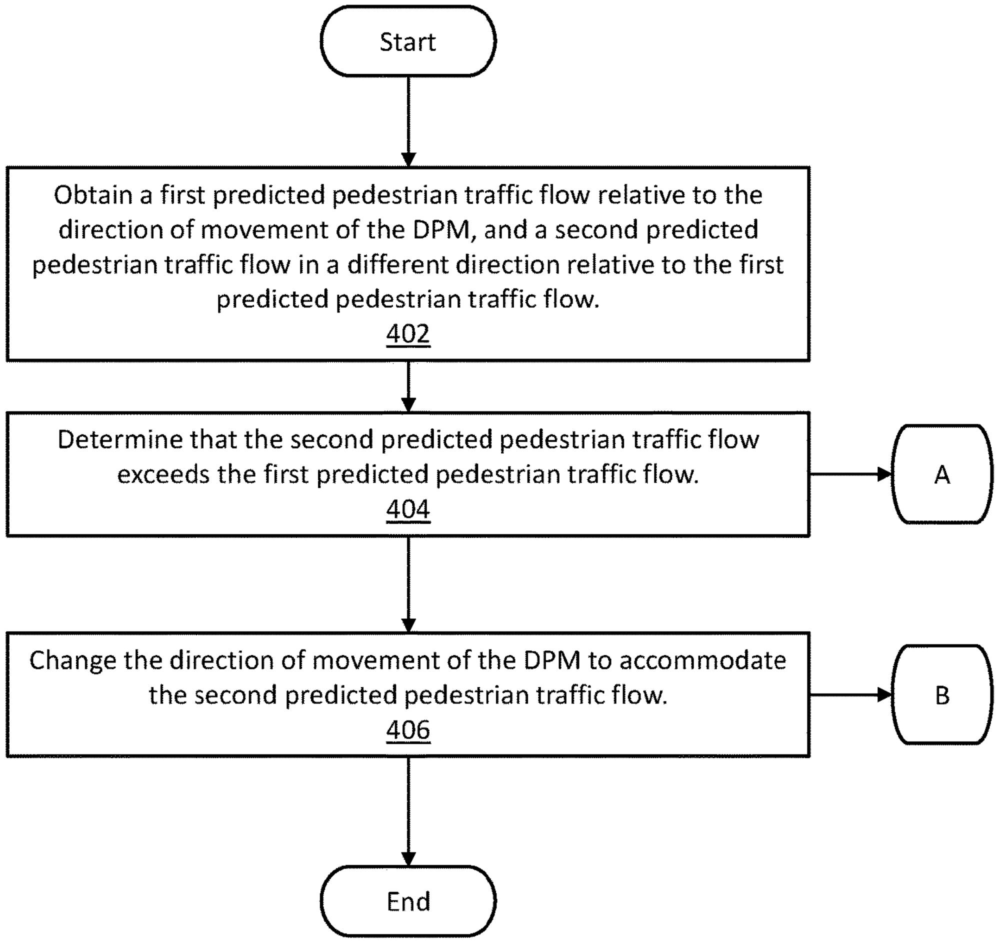
FIGS. 4, 5, and 6 are flowcharts illustrating the operation of DPM management program of FIG. 1, in accordance with an embodiment of the present invention.
Figure 5:
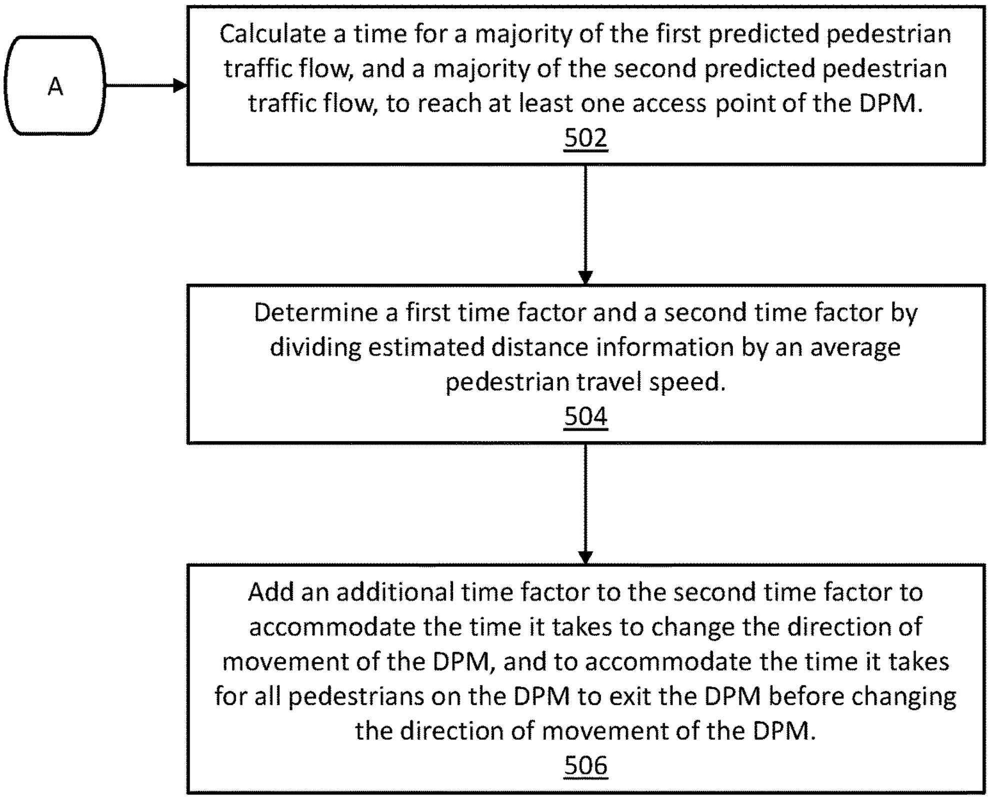
Figure 6:
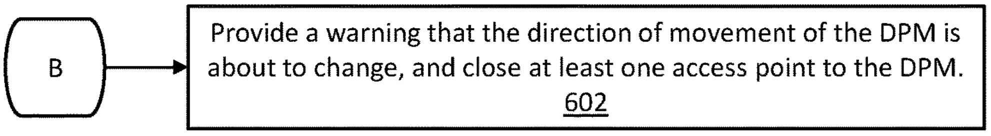

FIGS. 4-6 are flowcharts depicting operational steps of a method for implementing a program that prioritizes a direction of a DPM based on predicted pedestrian traffic flow, according to an embodiment of the present invention.

Referring now to FIGS. 1 and 4, DPM management program 122, via a processor, obtains a first predicted pedestrian traffic flow relative to the direction of movement of the DPM, and a second predicted pedestrian traffic flow in a different direction relative to the first predicted pedestrian traffic flow (step 402). In exemplary embodiments, the DPM may include one or more sensors to detect a pedestrian entering and exiting the DPM.

With continued reference to FIGS. 1 and 4, DPM management program 122, via a processor, determines that the second predicted pedestrian traffic flow exceeds the first predicted pedestrian traffic flow (step 404).

With continued reference to FIGS. 1 and 4, DPM management program 122, via a processor, changes the direction of movement of the DPM to accommodate the second predicted pedestrian traffic flow (step 406).

Referring now to FIGS. 1 and 5, DPM management program 122, via a processor, calculates a time for a majority of the first predicted pedestrian traffic flow, and a majority of the second predicted pedestrian traffic flow, to reach at least one access point of the DPM (step 502).

In exemplary embodiments, calculating a time for a majority of the first predicted pedestrian traffic flow, and a majority of the second predicted pedestrian traffic flow, to reach at least one access point of the DPM may further include: obtaining an average pedestrian density information, for the majority of the first predicted pedestrian traffic flow, and the majority of the second predicted pedestrian traffic flow, from respective locations and to at least one access point of the DPM; obtaining an average pedestrian travel speed toward the DPM, for the majority of the first predicted pedestrian traffic flow, and the majority of the second predicted pedestrian traffic flow, from the respective locations and to the at least one access point of the DPM; obtaining estimated distance information, for the majority of the first predicted pedestrian traffic flow, and the majority of the second predicted pedestrian traffic flow, from the respective locations and to the at least one access point of the DPM; obtaining one or more schedule of events, at a given venue, that may affect the majority of the first predicted pedestrian traffic flow, and the majority of the second predicted pedestrian traffic flow, from the respective locations and to the at least one access point of the DPM; and obtaining an estimated direction of the majority of the first predicted pedestrian traffic flow, and an estimated direction of the majority of the second predicted pedestrian traffic flow from the respective locations and to the at least one access point of the DPM.

In exemplary embodiments, and with continued reference to FIGS. 1 and 5, calculating a time for a majority of the first predicted pedestrian traffic flow, and a majority of the second predicted pedestrian traffic flow, to reach the at least one access point of the DPM, includes determining a first time factor by dividing estimated distance information, for the majority of the first predicted pedestrian traffic flow, by an average pedestrian travel speed, for the majority of the first predicted traffic flow, and determining a second time factor by dividing estimated distance information, for the majority of the second predicted pedestrian traffic flow, by an average pedestrian travel speed, for the majority of the second predicted traffic flow (step 504).

In exemplary embodiments, and with continued reference to FIGS. 1 and 5, calculating a time for a majority of the first predicted pedestrian traffic flow, and a majority of the second predicted pedestrian traffic flow, to reach the at least one access point of the DPM, further includes adding an additional time factor to the second time factor to accommodate the time it takes to change the direction of movement of the DPM, and adding an additional time factor to the second time factor to accommodate the time it takes for all pedestrians on the DPM to exit the DPM before changing the direction of movement of the DPM (step 506).

In exemplary embodiments, DPM management program 122, via a processor, changes the direction of movement of the DPM based on determining that the time for the majority of the second predicted pedestrian traffic flow to reach the at least one access point of the DPM is less than the time for the majority of the first pedestrian traffic flow to reach the at least one access point of the DPM.

In alternative embodiments, DPM management program 122, via a processor, is capable of queueing a list of times for changing the direction of movement of the DPM based on one or more schedule of events at a given venue.

Referring now to FIGS. 1 and 6, DPM management program 122, via a processor, is capable of providing a warning that the direction of movement of the DPM is about to change, and closing at least one access point to the DPM (step 602).

In exemplary embodiments, the DPM includes one or more sensors to detect a pedestrian entering and exiting the DPM.

In an alternative embodiment, DPM management program 122, via a processor, is further capable of detecting a location for one or more pedestrians at an airport via IoT sensors, obtaining a destination gate and departure time, for the one or more pedestrians at the airport, calculating a time for the one or more pedestrians to reach the destination gate, and changing the direction of movement of one or more DPMs, located between the one or more pedestrians and a respective destination gate along a travel path in the airport, to accommodate the one or more pedestrians that are at risk of not reaching the destination gate on time.

Figure 7:
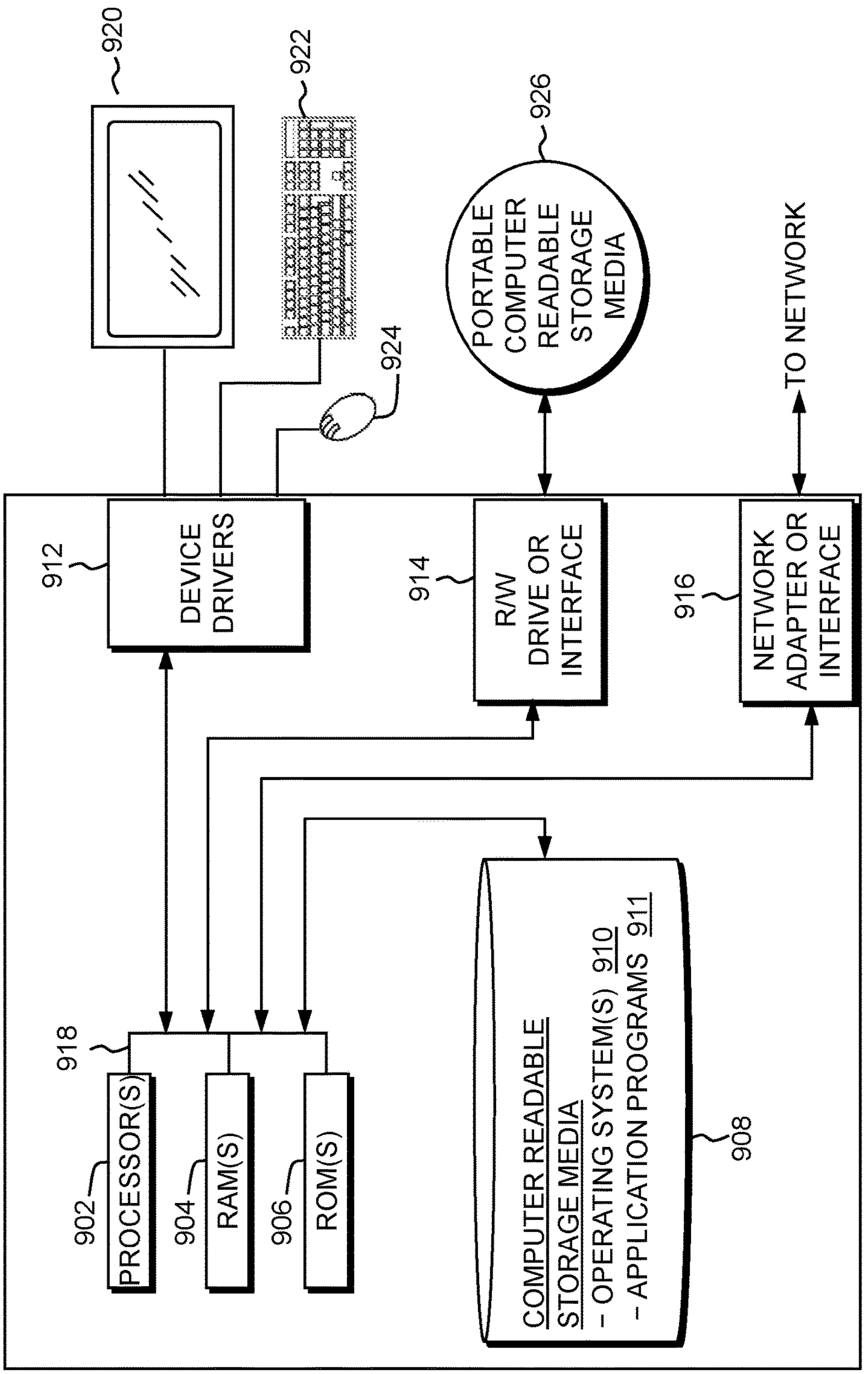
FIG. 7 is a diagram graphically illustrating the hardware components of a computing environment of FIG. 1, in accordance with an embodiment of the present invention.

FIG. 7 is a block diagram depicting components of a computing device (such as directional pedestrian mover 110, server 120, or database server 130, as shown in FIG. 1), in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as DPM management program 122, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 120 may also include a R/W drive or interface 914 to read from and write to one or more portable computer readable storage media 926. Application programs 911 on server 120 may be stored on one or more of the portable computer readable storage media 926, read via the respective R/W drive or interface 914 and loaded into the respective computer readable storage media 908.

Server 120 may also include a network adapter or interface 916, such as a TCP/IP adapter card or wireless communication adapter (such as a 4G wireless communication adapter using OFDMA technology). Application programs 911 on server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 8:
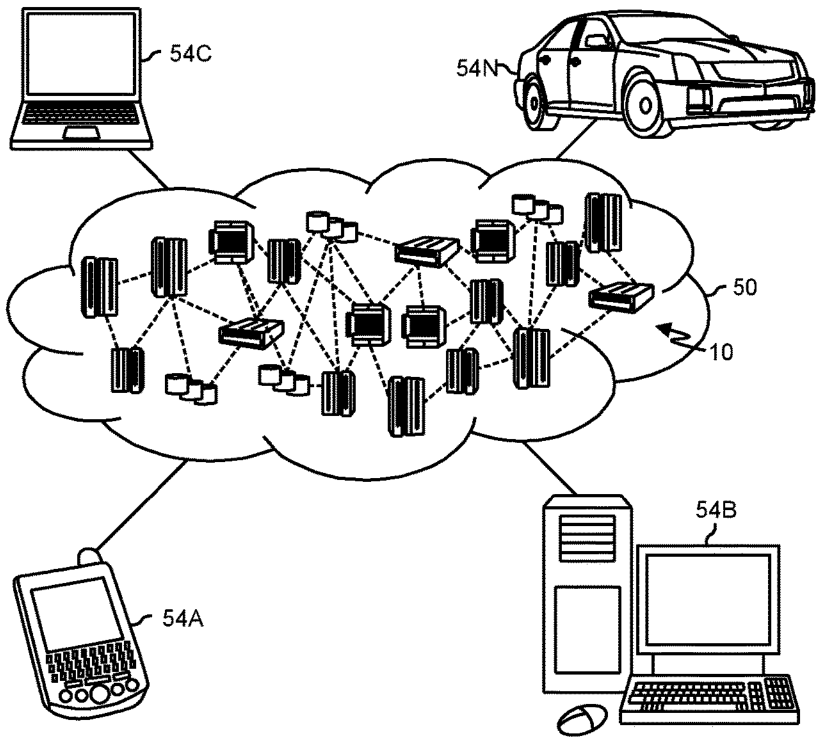
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
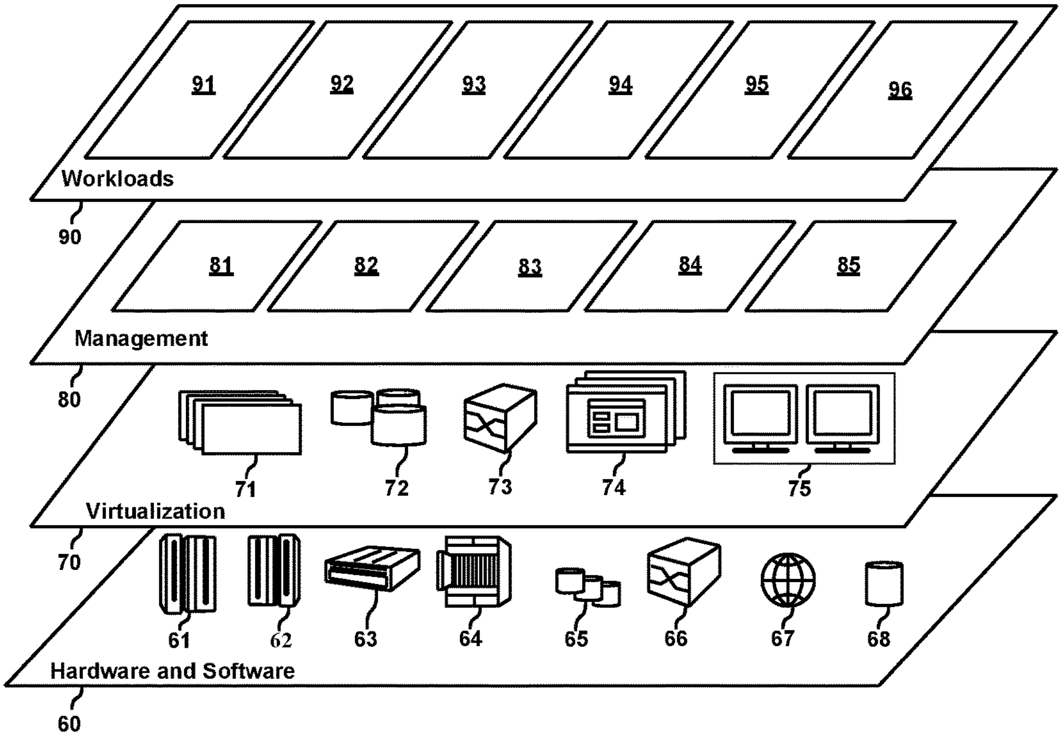
FIG. 9 depicts abstraction model layers of the illustrative cloud computing environment of FIG. 8, in accordance with an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method to prioritize a direction of movement of a directional pedestrian mover (DPM) based on predicted pedestrian traffic flow, the method comprising:

obtaining, by a pedestrian flow detector, a first predicted pedestrian traffic flow relative to the direction of movement of the DPM, and a second predicted pedestrian traffic flow in a different direction relative to the first predicted pedestrian traffic flow, the pedestrian flow detector receiving information from a plurality of sensors, wherein a majority of the first, or second, predicted pedestrian traffic flow may include a threshold value of a group of detected pedestrians;

calculating, by a pedestrian arrival time calculator, a time for a majority of the first predicted pedestrian traffic flow, and a majority of the second predicted pedestrian traffic flow, to reach at least one access point of the DPM, the pedestrian arrival time calculator receiving information from the plurality of sensors, wherein changing the direction of movement of the DPM is based on determining that the time for the majority of the second predicted pedestrian traffic flow to reach the at least one access point of the DPM is less than the time for the majority of the first pedestrian traffic flow to reach the at least one access point of the DPM;

obtaining, by the plurality of sensors, an average pedestrian density information, for the majority of the first predicted pedestrian traffic flow, and the majority of the second predicted pedestrian traffic flow, from respective locations and to at least one access point of the DPM;

obtaining, by the plurality of sensors, an average pedestrian travel speed, for the majority of the first predicted pedestrian traffic flow, and the majority of the second predicted pedestrian traffic flow, from the respective locations and to the at least one access point of the DPM;

obtaining, by the plurality of sensors, estimated distance information, for the majority of the first predicted pedestrian traffic flow, and the majority of the second predicted pedestrian traffic flow, from the respective locations and to the at least one access point of the DPM;

obtaining, by the pedestrian arrival time calculator, one or more schedule of events, at a given venue, that may affect the majority of the first predicted pedestrian traffic flow, and the majority of the second predicted pedestrian traffic flow, from the respective locations and to the at least one access point of the DPM; and obtaining, by the pedestrian arrival time calculator, an estimated direction of the majority of the first predicted pedestrian traffic flow, and an estimated direction of the majority of the second predicted pedestrian traffic flow, from the respective locations and to the at least one access point of the DPM;

determining, by the pedestrian arrival time calculator, a first time factor by dividing estimated distance information, for the majority of the first predicted pedestrian traffic flow, by an average pedestrian travel speed, for the majority of the first predicted traffic flow;

determining, by the pedestrian arrival time calculator, a second time factor by dividing estimated distance information, for the majority of the second predicted pedestrian traffic flow, by an average pedestrian travel speed, for the majority of the second predicted traffic flow;

adding, by the pedestrian arrival time calculator, an additional time factor to the second time factor to accommodate the time it takes to change the direction of movement of the DPM;

adding, by the pedestrian arrival time calculator, an additional time factor to the second time factor to accommodate the time it takes for all pedestrians on the DPM to exit the DPM before changing the direction of movement of the DPM;

determining, by a processor, that the second predicted pedestrian traffic flow exceeds the first predicted pedestrian traffic flow;

determining, by the processor, that the time for the majority of the second predicted pedestrian traffic flow to reach the at least one access point of the DPM is less than the time for the majority of the first pedestrian traffic flow to reach the at least one access point of the DPM, the processor comprising executable instructions for:

providing a warning, using visual, audio, or other indicators, that the direction of movement of the DPM is about to change;

closing at least one access point to the DPM; and changing the direction of movement of the DPM to accommodate the second predicted pedestrian traffic flow, based on the determining that the time for the majority of the second predicted pedestrian traffic flow to reach the at least one access point of the DPM is less than the time for the majority of the first pedestrian traffic flow to reach the at least one access point of the DPM.

* * * * *